(12) United States Patent
Mirfakhraei et al.

(10) Patent No.: US 10,880,132 B1
(45) Date of Patent: *Dec. 29, 2020

(54) DISTORTION CANCELLATION

(71) Applicant: Cisco Technology, Inc., San Jose, CA (US)

(72) Inventors: Khashayar Mirfakhraei, Los Altos, CA (US); Ardalan Alizadeh, San Jose, CA (US); Xu Zhang, Fremont, CA (US); Daniel J. Lyons, Medina, OH (US); Gautam D. Bhanage, Milpitas, CA (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,015

(22) Filed: Oct. 28, 2019

(51) Int. Cl.
    *H04L 25/03* (2006.01)
(52) U.S. Cl.
    CPC .... *H04L 25/0328* (2013.01); *H04L 25/03286* (2013.01); *H04L 25/03292* (2013.01)
(58) Field of Classification Search
    CPC .. H04B 17/309; H04B 17/345; H04B 7/0891; H04B 2201/70979; H04B 17/20; H04L 25/03286; H04L 25/0328; H04L 25/03292
    USPC ........ 375/144, 148, 229–230, 232, 347, 349
    See application file for complete search history.

(56) References Cited

U.S. PATENT DOCUMENTS

| | | | |
|---|---|---|---|
| 5,111,484 A * | 5/1992 | Karabinis | H04L 25/03324 375/340 |
| 8,144,807 B2 | 3/2012 | Mirfakhraei et al. | |
| 9,467,986 B2 | 10/2016 | Lyons | |
| 9,686,104 B2 * | 6/2017 | Eliaz | H04L 25/03305 |
| 9,866,416 B2 | 1/2018 | Lyons | |
| 10,616,011 B1 * | 4/2020 | Mirfakhraei | H04L 25/03292 |
| 2005/0053172 A1 * | 3/2005 | Heikkila | H04B 7/0891 375/333 |
| 2005/0163268 A1 * | 7/2005 | McCallister | H03F 1/3247 375/346 |

(Continued)

OTHER PUBLICATIONS

Heino et al., Recent Advances in Antenna Design and Interference Cancellation Algorithms for In-Band Full Duplex Relays, IEEE Comm., vol. 53 No. 5 (May 2015) [Abstract Only].

(Continued)

*Primary Examiner* — Emmanuel Bayard
(74) *Attorney, Agent, or Firm* — Patterson + Sheridan, LLP

(57) ABSTRACT

The present disclosure provides for distortion cancellation by receiving a collided signal, the collided signal comprising a plurality of signals that each carry a corresponding packet; for a first signal of the plurality of signals that includes a first packet: amplifying and digitizing the collided signal into a first digital signal at a first gain; and decoding the first packet from the first digital signal; for each signal of the plurality of signals other than the first signal, carrying a given packet: estimating a given linear interference component and a given nonlinear interference component of one or more prior packets to the given packet on the collided signal; removing the given linear interference component and the given nonlinear interference component from the collided signal to produce a given de-interfered signal; and decoding the given packet of the plurality of packets from the given de-interfered signal.

20 Claims, 10 Drawing Sheets

(56) References Cited

U.S. PATENT DOCUMENTS

2006/0227908 A1* 10/2006 Scharf .................. H04B 1/7117
375/346
2012/0122415 A1* 5/2012 Saitoh ................. H04L 25/0206
455/296

OTHER PUBLICATIONS

A. Balatsoukas-Stimming, Non-linear self-interference cancellation in full-duplex using Neural Networks, Telecommunication Circuits Lab., Fed. P.Tech. School of Lausanne, (Oct. 5, 2018).
D. Korpi, L. Anttila, & M. Valkama, Nonlinear self-interference cancellation in MIMO full-duplex transceivers under crosstalk, EURASIPJournal on Wireless Comm. and Netw., vol. 2017, No. 1, p. 24, Feb. 2017.
P. Patel & J. Holtzman, Analysis of a simple successive interference cancellation scheme in a DS/CDMA system, IEEE J. on Selected Areas in Communications, vol. 12, No. 5, pp. 796-807 (Jun. 1994) [Abstract Only].
U.S. Appl. No. 16/453,839 "Distortion Cancellation," filed Jun. 26, 2019.
U.S. Appl. No. 16/457,588, "Distortion Cancellation," filed Jun. 28, 2019.

* cited by examiner

DISTORTION CANCELLATION

TECHNICAL FIELD

Embodiments presented in this disclosure generally relate to wireless receivers. More specifically, embodiments disclosed herein relate to wireless receivers adapted to identify individual packets transmitted on a shared channel at a shared time that interfere with one another

BACKGROUND

When multiple wireless devices within communication range of one another communicate, the signals may be separated in time and/or frequency to allow receiving devices to differentiate individual communications. For example, the available frequencies for communications between two devices may be divided into several channels so that the two devices may transmit data at the same time in different portions of the available frequency range, and the receiving devices can identify an individual communication by filtering out data carried in undesired frequencies of the range. In another example, two devices may communicate in a shared frequency range by specifying various times that are reserved for particular communications, so that a first communication is sent during a first time window (and not during a second time window), and a second communication is sent during a second time window (and not during the first time window), to that a receiving device can identify an individual communication based on an associated time window (also referred to as time multiplexing). However, even when the communications medium has been divided into channels or time divisions, two or more transmissions may collide and interfere with one another at a receiving device due to multi-pathing, carrier signal drift, clock drift, the devices moving within the environment, the addition of new devices to the environment, etc.

As used herein, a collided signal is an analog signal that includes two or more other component analog signals received from a corresponding number of signal sources. A signal collision between the two or more component analog signals (resulting in a collided signal at a receiving device) may occur in a Frequency Division Multiplexed (FDM) environment, a Time Division Multiplexed (TDM) environment, or a Frequency and Time Division Multiplexed (FTDM) environment, when the component analog signals share at least a portion of the same frequency range for at least a portion of the same time window. As opposed to signals that merely interfere with one another, each of the component analog signals that collide to form the collided signal carry a corresponding digital packet of data that is of interest to the receiving device. Stated differently, the collided signal includes two or more packets that the receiving device is expecting to receive, but did not expect to receive in the same time or frequency division. Accordingly, the receiving device attempts to extract all of the packets from the collided signal.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
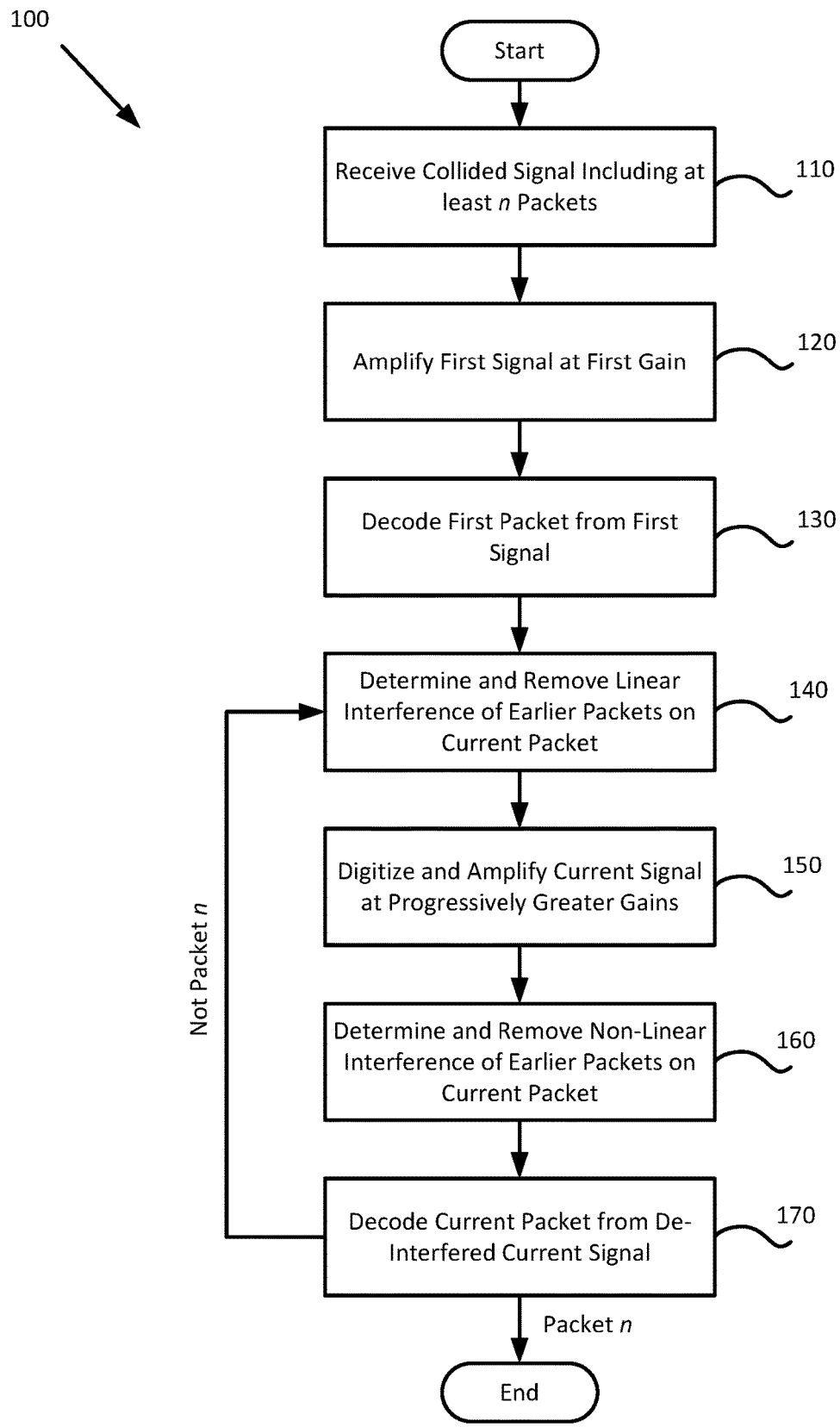
FIG. 1 is a flowchart for de-colliding several component signals in a collided signal, according to embodiments of the present disclosure.

One embodiment presented in this disclosure is a system that includes: a primary receiver pathway, configured to digitize and amplify a collided signal including a plurality of packets at a first gain to produce a first digitized signal; a primary receiver, configured to decode a first packet of the plurality of packets from the collided signal as digitized and amplified by the primary receiver pathway; a plurality of branches arranged in cascading sequence from the primary receiver pathway, wherein each branch is configured to extract a given packet and comprises: a linear estimation line configured to estimate a given linear interference component of one or more prior packets to the given packet on the collided signal; a nonlinear estimation line configured to estimate a given nonlinear interference component of the one or more prior packets to the given packet on the collided signal; a packet extraction pathway configured to remove the given linear interference component and the given nonlinear interference component from the collided signal to produce a given de-interfered signal; and a branch receiver configured to decode the given packet of the plurality of packets from the given de-interfered signal.

One embodiment presented in this disclosure is a method that includes: receiving a collided signal, the collided signal comprising a plurality of signals that each carry a corresponding packet; for a first signal of the plurality of signals that includes a first packet: amplifying and digitizing the collided signal into a first digital signal at a first gain; and decoding the first packet from the first digital signal; for each signal of the plurality of signals other than the first signal, carrying a given packet: estimating a given linear interference component and a given nonlinear interference component of one or more prior packets to the given packet on the collided signal; removing the given linear interference component and the given nonlinear interference component from the collided signal to produce a given de-interfered signal; and decoding the given packet of the plurality of packets from the given de-interfered signal.

One embodiment presented in this disclosure is a computer readable storage medium, including instructions that when executed by a processor enable the processor to perform an operation that includes: receiving a collided signal, the collided signal comprising a plurality of signals that each carry a corresponding packet; for a first signal of the plurality of signals that includes a first packet: amplifying and digitizing the collided signal into a first digital signal at a first gain; and decoding the first packet from the first digital signal; for each signal of the plurality of signals other than the first signal, carrying a given packet: estimating a given linear interference component and a given nonlinear interference component of one or more prior packets to the given packet on the collided signal; removing the given linear interference component and the given nonlinear interference component from the collided signal to produce a given de-interfered signal; and decoding the given packet of the plurality of packets from the given de-interfered signal.

EXAMPLE EMBODIMENTS

To extract the individual packets included in a collided signal, a receiving device may perform various analyses to determine the interfering effect of a first packet on a second packet in the collided signal and the interfering effect of the second packet on the first packet. The receiving device may then remove the interfering effects of the first and second packets from the collided signal to produce a de-interfered versions of the collided signal from which the first and second packets can be decoded. However, a receiving device may receive n collided packets (e.g., from n devices), where n>2, such that each signal is affected by up to n−1 other signals, which the receiving device removes to produce n de-interfered versions to properly interpret the n collided packets.

In a dynamic gain receiver, which adjusts the amplification of received signals to the operational range of an associated Analog to Digital Converter (ADC), when the amplitudes of the component signals of the collided signal differ, the receiver may apply a dynamic gain appropriate for one component signal and inappropriate for another component signal, which may result in lower fidelity extraction and decoding of the individual packets than if the component signals were received individually. This inappropriate gain application may be compounded as more component signals are received with different individual signal strengths. For example, if the dynamic gain is set to a high value for a first component signal, and a higher-powered second component signal and a lower-powered third component signal collide with the first component signal, the receiver may over-amplify the collided signal, which results in nonlinear distortions and increased harmonics when interpreting the second and third component signals.

The embodiments herein employ path diversity (spatial or Radio Frequency in various embodiments) with multiple different gain levels to extract the individual packets from the collided signal. Signal paths are set to apply progressively higher gains (e.g., gain 1<gain 2<gain 3< . . . gain n) based on the characteristics of the received signals (e.g., amplitude ranges). The confounding interference effects are removed via parallel processing pathways to remove the linear and nonlinear interference components of the other packets on a given packet of the n packets determined to be included in the collided signal. To improve the accuracy at which the receiving device determines the linear and nonlinear components of the interference of the earlier packets on the subsequent packets, a nonlinear estimator and linear estimator may be trained either online or offline using various machine learning techniques.

As a matter of convention herein, analog signals (and formulas based on analog signals) are indicated herein as functions of time (indicated as y(t)), whereas the digital signals (and formulas based on digital signals) are indicated herein as functions of time windows or steps (indicated as y[n]). Additionally, a given component, signal, or formula may be indicated by an ordinal and/or a letter designator (e.g., a first widget or widget "a"). In a series of elements a-n, the element designated as the first shall be designated with the letter "a", the last element designated with the italicized letter "n", and the second-to-last (i.e., penultimate) element with the italicized letter "m". For example, in a series of three elements, the first element may be designated with an "a", the second element with a "b" or "m", and the third element with a "c" or "n". Similarly, when referring to two sets of elements, a first set of elements a-n shall be understood to include one more member than a second set of elements a-m or b-n. When referring to a given element of indeterminate position in a series of a-n (or a-m), the present disclosure may make reference to the $x^{th}$ element, which may be any one of the elements in the series. Similarly, an element immediately prior to the $x^{th}$ element in the series may be referred to as the $(x-1)^{th}$ element, or the like.

FIG. 1 is a flowchart of a method 100 for de-colliding several component signals in a collided signal, according to embodiments of the present disclosure. Method 100 begins at block 110, where the de-collider receives a collided signal (also referred to herein as "$s_K(t)$") that includes a n packets, where n≥2. The de-collider decodes each packet from the collided signal on separate signal pathways or branches within the de-collider. In some embodiments, the de-collider receives the collided signal via a single antenna and splits the collided signal onto a primary receiver pathway and m (where m=n−1) individual branches to decode the individual packets. In other embodiments, the de-collider receives the collided signal via n or more antennas that are handled as different layers to account for spatial separation effects in decoding the packets.

At block 120, the de-collider applies a first gain (G1) to a first signal carried on the primary receiver pathway. An amplifier dynamically matches the amplitude of the first signal to the operational range of an ADC on the primary receiver pathway by applying a first Radio Frequency gain (G1-RF). The ADC in turn applies an amplification of a first baseband gain (G1-BB) to the amplified first signal when digitizing the first signal. The total gain of the first signal pathway may be expressed as the gain of the amplifier multiplied by the gain of the ADC (i.e., G1=G1-RF*G1-BB). In some embodiments, the first gain (G1) is set as a predefined fraction of a subsequent gain (e.g., G2) applied on a first branch. In other embodiments, the first gain G1 is set based on the amplitude of the first component signal of the collided signal, which may be the earliest-received component signal or the component signal with the greatest amplitude at the time of reception.

At block 130, the de-collider decodes the first packet from the digitized first signal. In some embodiments, the first packet is output for use by various applications and components downstream from the de-collider as well as for the subsequent branches of the de-collider.

Method 100 performs blocks 140 through 170 m times; once for each of the remaining m packets carried by the m component signals in the collided signal $s_K(t)$.

At block 140, the de-collider determines and removes the linear interference of the prior packets on the current packet in the collided signal. For example, for the second packet, the de-collider determines the linear interference of the first packet on the second packet, whereas for the last (i.e., $n^{th}$) packet, the de-collider determines the linear interference of the first through $m^{th}$ packets on the $n^{th}$ packet. The linear interference component may be calculated as a digital value, and be converted to an analog value for removal from the analog collided signal received by the given branch of the de-collider.

At block 150, the de-collider digitizes and applies a gain (Gx) to a current signal carried on current branch. In some embodiments, the current amplifier sets the total current gain Gx to be greater than the prior gain G(x−1). In some embodiments, the current amplifier sets at least one of the current RF gain Gx-RF and the current baseband gain Gx-BB to be greater than the prior gain G(x−1). In various embodiments, the de-collider applies the RF gain Gx-RF before or in parallel with removing the linear interference component from the current collided signal (per block 140), digitizes the partially de-interfered signal, and then applies the BB gain Gx-BB before or in parallel with removing the nonlinear interference component from the partially de-interfered signal (per block 160).

At block 160, the de-collider determines and removes the nonlinear interference component of the prior packets from the current signal. In some embodiments, the de-collider determines the nonlinear interference component of the first packet, which is individually removed from all subsequent packets.

At block 170, the de-collider decodes the current packet x from the de-interfered current signal x. In various embodiments, the de-collider uses the same receiver to de-code all of the packets, while in other embodiments, the de-collider uses x different receivers to decode the respective packets (per block 130 and block 170). In some embodiments, the receiver is an EVERSCALE™ receiver (available from Cisco Systems, Inc. of San Jose, Calif.), although other de-coding receivers may be used in other embodiments.

Figure 2A:
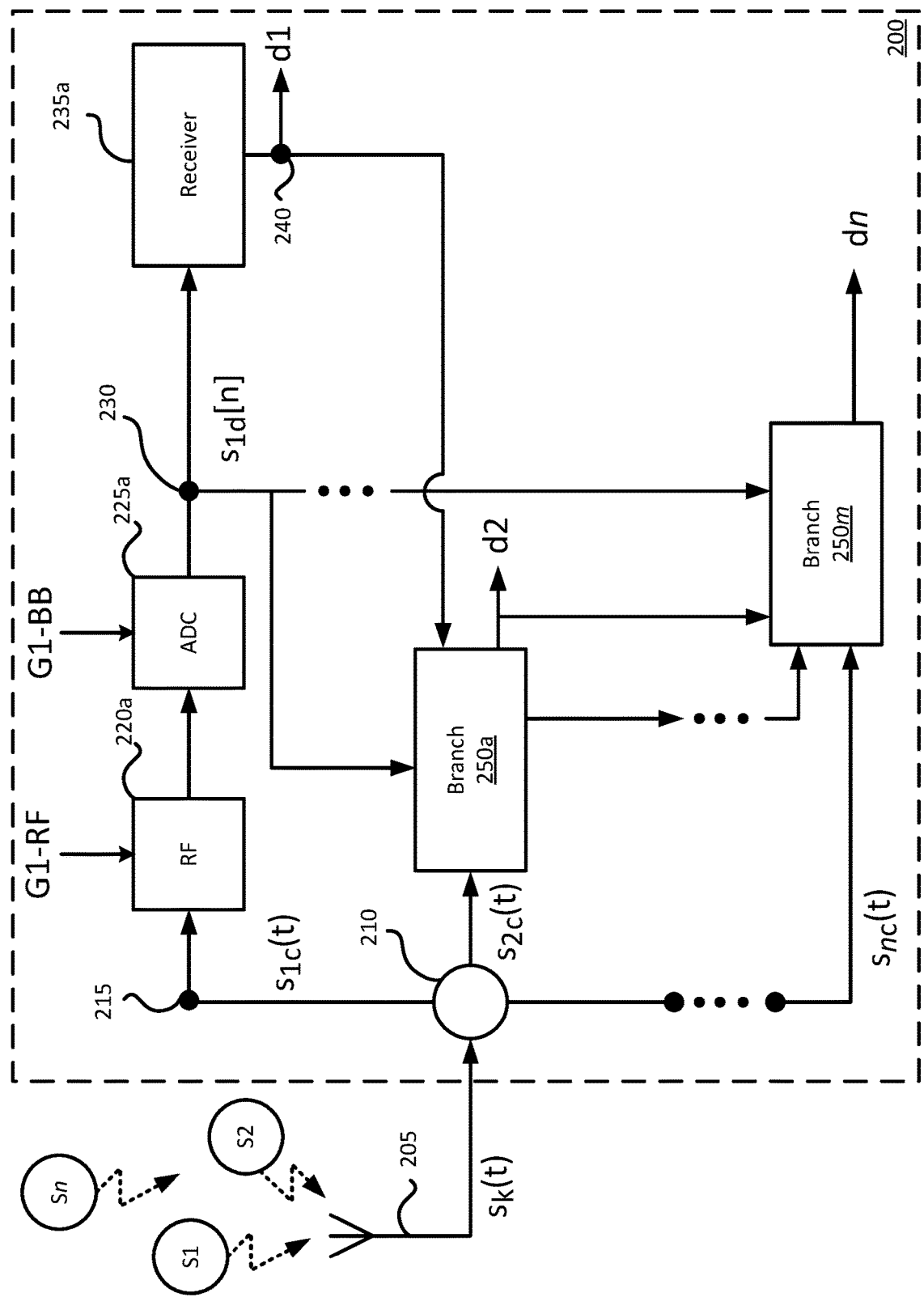
FIGS. 2A-2C illustrate schematics and components of a de-collider, according to embodiments of the present disclosure.
Figure 2B:
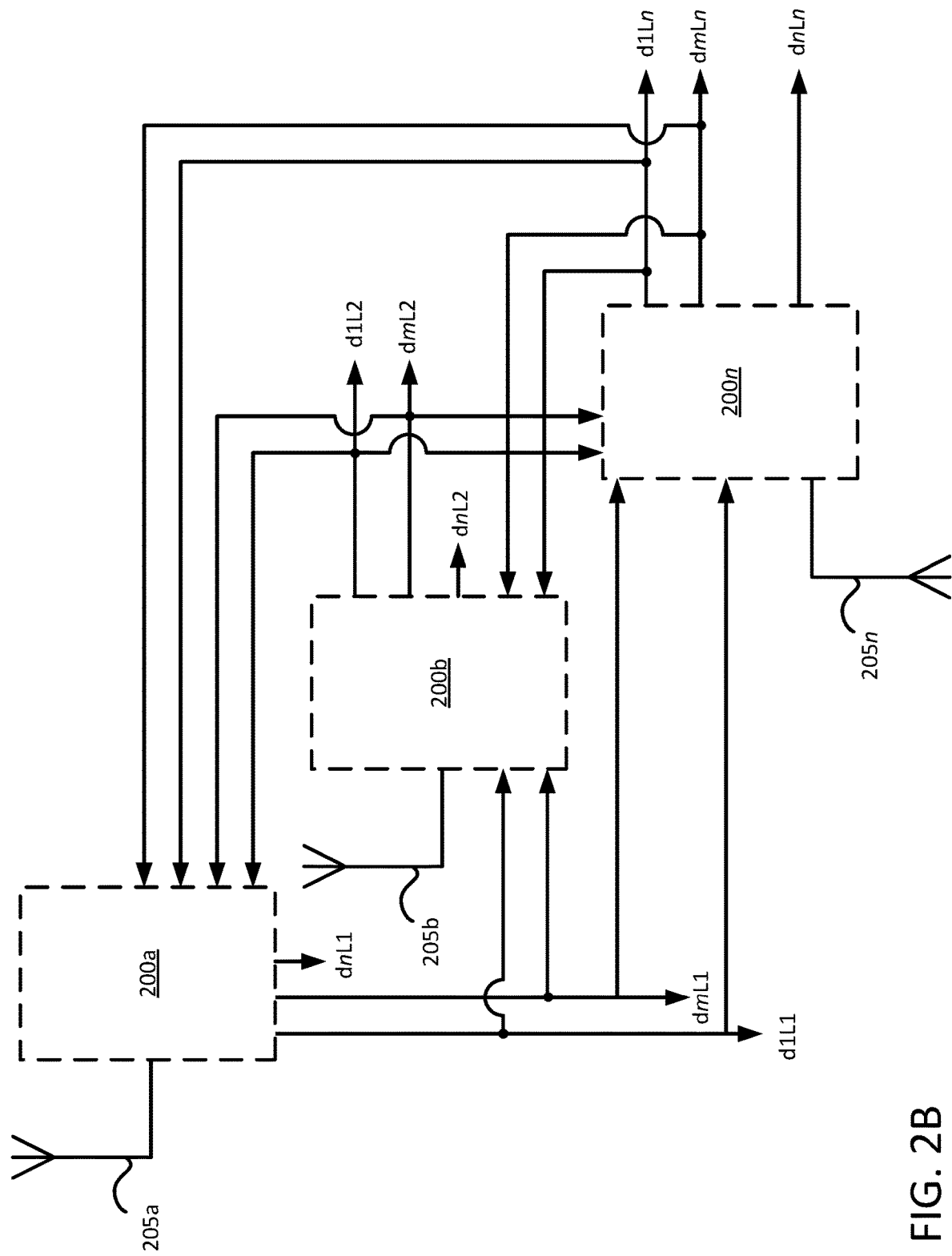
Figure 2C:
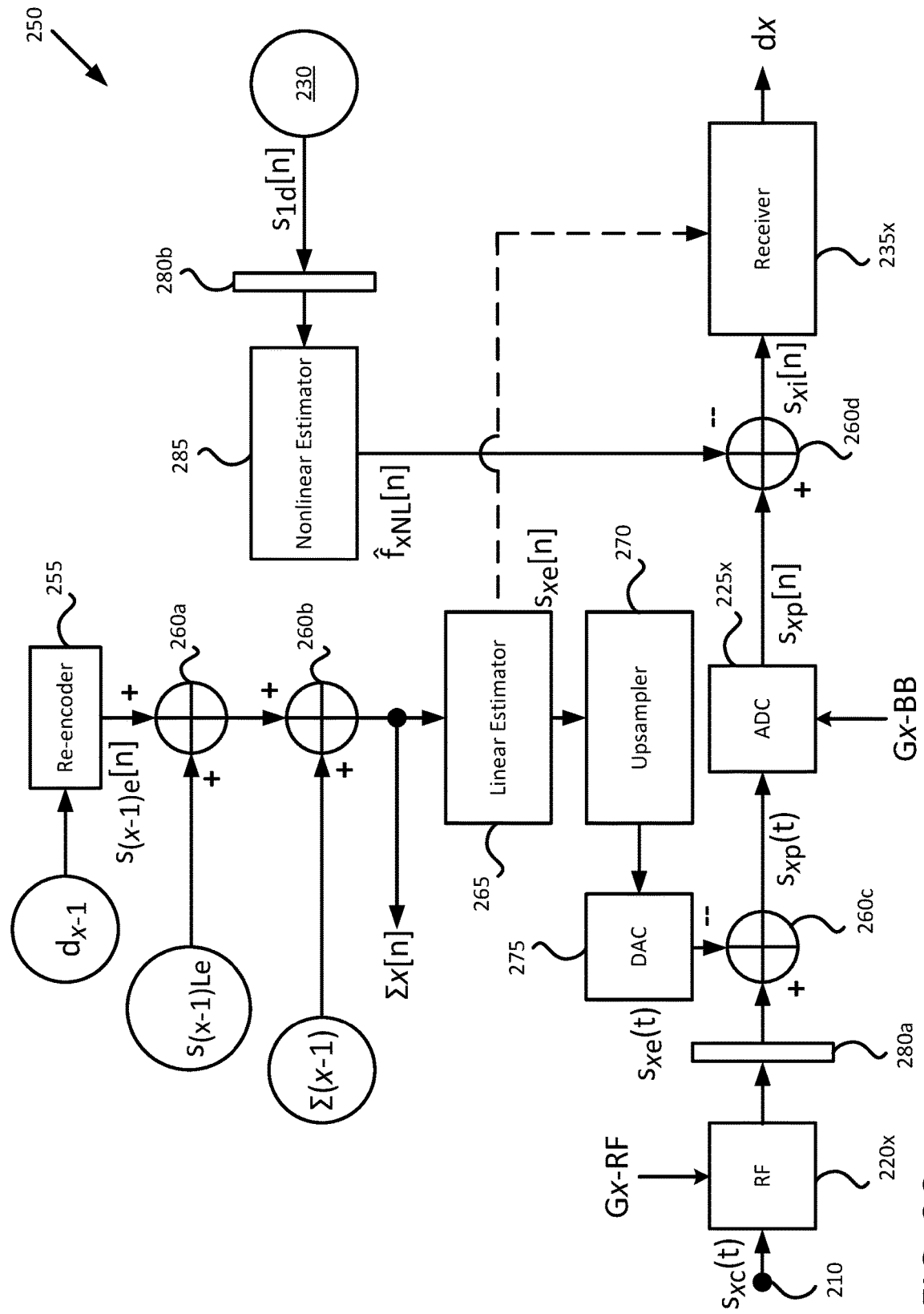

When the current packet x decoded at block 170 is the $n^{th}$ packet in the collided signal, method 100 may conclude. Otherwise, method 100 returns to block 140 to process the component signal and packet in the collided signal FIGS. 2A-2C illustrate schematics and components of a de-collider 200 according to embodiments of the present disclosure. FIG. 2A illustrates a de-collider 200 that de-collides up to n packets from a collided signal received on an antenna 205. The collided signal $s_k(t)$ includes several component signals $s_{1-n}(t)$ received from several sources $S_1$-$S_n$, which are subject to various channel conditions $h_x(t)$ between the associated source $S_x$ and the antenna 205, such that the collided signal $s_k(t)$ received by the antenna 205 may be represented according to Formula 1.

$$s_k(t)=h_1(t)*s_1(t)+h_2(t)*s_2(t) \ldots +h_n(t)*s_n(t) \quad (1)$$

A splitter 210 in communication with the antenna 205 in FIG. 2A splits the collided signal $s_k(t)$ onto a primary receiver signal pathway and a plurality pathways of de-collider branches 250a-m (generally, branch 250), where the total number of branches 250a-m is one less than the number of component signals. The splitter 210 can divide the collided signal $s_k(t)$ into n substantially equal (±10%) amplitude signals, although in other embodiments, the amplitudes of the different signals may be unevenly split by the splitter 210. The first collided signal $s_{1c}(t)$, the second collided signal $s_{2c}(t)$, and the $n^{th}$ collided signal $s_{nc}(t)$ carried on the respective pathways may thus be represented according to Formula 2 and optionally according to Formula 3 in the embodiment illustrated in FIG. 2A.

$$s_k(t)=s_{1c}(t)+s_{2c}(t) \ldots +s_{nc}(t) \quad (2)$$

$$s_{1c}(t) \approx s_{nc}(t) \approx (h_1(t)*s_1(t)+h_2(t)*s_2(t) \ldots +h_n(t)*s_n(t))/n \quad (3)$$

The primary receiver pathway (from node 215 to node 240) decodes a first packet (e.g., first decoded packet $d_1$) from the first collided signal $s_{1c}(t)$. The primary receiver pathway includes a first amplifier 220a (generally, amplifier 220) and a first Analog to Digital Converter (ADC) 225a (generally, ADC 225). The first amplifier 220a applies a gain of G1-RF to the first collided signal $s_{1c}(t)$, and the first ADC 225a digitizes the first collided signal $s_{1c}(t)$ and applies a baseband gain of G1-BB to the collided signal $s_{1c}(t)$ to produce a first digitized signal $s_{1d}[n]$ at the third node 230. Each of the branches 250a-m and a first receiver 235a (generally, receiver 235) receive the first digitized signal $s_{1d}[n]$. The first receiver 235a accepts the first digitized signal $s_{1d}[n]$ and decodes the first packet onto a first output as a decoded first packet $d_1$. The overall gain G1 on the primary receiver pathway may be represented according to Formula 4.

$$G1=G1\text{-}RF*G1\text{-}BB \quad (4)$$

Each branch 250 receives an associated collided signal $s_{xc}(t)$, the first digitized signal $s_{1d}[n]$, and the prior decoded packet $d_{(x-1)}$ to produce the associated decoded packet $d_x$. The components and operation of a branch 250 are discussed in greater detail in regard to FIG. 2C. Each branch 250 decodes the packet of the next-weaker component signal $s_x(t)$ from the collided signal $s_{xc}(t)$ by removing the collective effects of the component signals s(t) decoded by earlier branches 250 from the current component signal $s_x(t)$. By removing prior effects from the collided signal $s_{xc}(t)$, each branch 250 can apply successively larger gains to the associated collided signal $s_{xc}(t)$ to decode the packet without introducing nonlinear distortions to the resulting signal. Accordingly, the total gain on each branch 250, may be represented by the product of the associated gains applied by the associated amplifiers 220 and ADCs 225 according to Formula 5, and the relationships of the total gains between the primary receiver pathway and the branches 250 according to Formula 6.

$$Gx=Gx\text{-}RF*Gx\text{-}BB \quad (5)$$

$$G1<G2<G3 \ldots <Gn \quad (6)$$

The non-linearities of the primary receiver pathway may be may be included in the first digitized signal $s_{1d}[n]$ as a respective nonlinear interference component $f_{1NL}$. Any noise in the signal paths, first amplifies 220a, and first ADC 225a may be included in the first digitized signal as component $v_1$. Accordingly, a first digitized signal $s_{1d}[n]$ may be represented according to Formula 7.

$$s_{1d}[n]=G_1*(h_1[n]*s_1[n]+h_2[n] \ldots +h_2[n]*s_2[n])+f_{1NL}$$
$$(h_1[n]*s_1[n],h_2[n]*s_2[n], \ldots h_n[n]*s_n[n])+v_1 \quad (7)$$

FIG. 2B illustrates several crosslinked layers of different de-colliders 200a-n, as may be employed in handling and de-colliding up to n spatially separated signals, according to embodiments of the present disclosure. In an Access Point (AP) or other multi-antenna device, several different antennas 205a-n may each receive the same component signals from the same sources, but with different channel conditions. For example, a first component signal $s_1(t)$, from the first signal source $S_1$, is subject to first primary channel conditions $h_{1a}(t)$ (e.g., interference, noise, path losses) at the first antenna 205a, second primary channel conditions $h_{2a}(t)$ at the second antenna 205b, and $n^{th}$ primary channel conditions $h_{na}(t)$ at the nth antenna 205n. Similarly, the second component signal $s_2(t)$ from the second signal source $S_2$ through the $n^{th}$ component signal $s_n(t)$ from the $n^{th}$ signal source $S_n$ are subjected to n channel effects corresponding to each of the n antennas 205a-n associated with the n layers of de-colliders 200a-n. The collided signal $s_{kx}(t)$ received at antenna 205x may therefore be represented according to Formula 8.

$$s_{kx}(t)=h_{1x}(t)*s_1(t)+h_{2x}(t)*s_2(t) \ldots +h_{nx}(t)*s_n(t) \quad (8)$$

The n de-colliders 200a-n can each decode up to n packets (e.g., $d_1$-$d_n$) on a collided signal $s_k(t)$. As each antenna 205 receives the component signals $s_{a-n}(t)$ with different channel effects h(t) applied thereto, some of the associated de-colliders 200 may be more or less accurate in decoding particular packets carried by the component signals s(t) when de-colliding the associated collided signal $s_k(t)$. In some embodiments, therefore, the decoded packets $d_x$ from each layer are shared with the subsequent branch 250 in the other layers. For example, a first de-collider 200a can individually produce a decoded first packet $d_1$ that is different from how the second de-collider 200b or the $n^{th}$ de-collider 200n decodes the decoded first packet $d_1$. Accordingly, the first de-collider 200a provides a first layer decoded first packet $d_{1L1}$ to the other de-colliders 200b-n, the second de-collider 200b provides a second layer decoded first packet $d_{1L2}$ to the other de-colliders 200a-n, and the $n^{th}$ de-collider 200n provides the other de-colliders 200a-b an $n^{th}$ layer decoded first packet $d_{1Ln}$. Similarly, the de-colliders 200 can share the second through penultimate decoded packets (i.e., $d_{mLx}$) to enable the branches 250 in each de-collider 200 to produce more accurate reconstructions of the transmitted packets.

FIG. 2C illustrates components of a branch 250, according to embodiments of the present disclosure. The branch 250 is configured to decode a given packet included on a given component signal $s_x(t)$ by removing the effects of the stronger component signals s(t) of the collided signal $s_{xc}(t)$ and decoding the packet from a de-interfered signal $s_i[n]$. The branch 250 includes a linear estimation line, including a re-encoder 255, one or more summing multiplexers 260a-b (generally, multiplexer 260), a linear estimator 265, an upsampler 270, and a digital to analog converter (DAC) 275. The branch 250 includes a de-interfering pathway that includes an $x^{th}$ amplifier 220x, a first delay element 280a (generally, delay element 280), two subtracting multiplexers 260c-d (also referred to as subtractors), an $x^{th}$ ADC 225x, and an $x^{th}$ receiver 245x. The branch 250 also includes a nonlinear estimation line, including a second delay element 280b and a nonlinear estimator 285.

The linear estimation line receives the decoded packet $d_{(x-1)}$ from the immediately prior branch 250 (or the primary receiver line in the case of a first branch 250a) so that the value of the prior decoded packet $d_{(x-1)}$ can be used in determining the value of the current decoded packet $d_x$. The re-encoder 255 re-encodes the prior decoded packet $d_{(x-1)}$ into an $(x-1)^{th}$ estimated digital signal $s_{(x-1)e}[n]$ that estimates or approximates the prior channel effects $h_{(x-1)}[n]$ (as $\hat{h}_{(x-1)}[n]$) and the first component signal $s_{(x-1)}[n]$ (as $\hat{s}_{(x-1)}[n]$) that produced the prior decoded packet $d_{(x-1)}$, which may be represented according to Formula 9.

$$s_{(x-1)e}[n]=\hat{h}_{(x-1)}[n]*\hat{s}_{(x-1)}[n] \quad (9)$$

As will be appreciated, the first channel effect and the associated estimated first channel effect (i.e., $h_1[n]$ and $\hat{h}_1[n]$) may be different from one another. Similarly, the first component signal and the associated estimated first component signal (i.e., $s_1[n]$ and $\hat{s}_1[n]$) may be different from one another. The differences in the estimated and actual values for the first channel effect and first component signal may be the result of noise in the earlier signal pathway (e.g., $v_1$ or $h_{x-1}[n]*s_{x-1}[n]$) or non-linearities introduced by prior ADCs 225 (e.g., $f_{1NL}[n]$), and the re-encoder 255 may be more accurate when the SNRs on the earlier signal pathways are lower and the earlier receivers 235 can more accurately decode the earlier packets.

In embodiments that handle spatially separated signals (received at different antennas 205, as per FIG. 2B), the linear estimation line also receives the streams from the other layers for the prior estimated signal $s_{(x-1)Le}[n]$ at a first multiplexer 260a, which adds the determinations from the other layers to the current layer's determination. For example, when using three layers (each associated with a spatially separated antenna 205), the first layer receives the prior estimated signal from the second layer $s_{(x-1)L2e}[n]$ and the prior estimated signal from the third layer $s_{(x-1)L3e}[n]$, which are combined with the prior estimated signal $s_{(x-1)e}[n]$ as determined by the re-encoder 255. As used herein, each signal received and processed by a spatially separated antenna 205 and de-collider 200 may be referred to as a "layered" version of that signal. For example, a first component signal $s_{1c}(t)$ may be referred to as a first layered component signal $s_{1cL}(t)$ when shared between branches 250 associated with a spatially separated antenna 205, or an first $x^{th}$ layered component signal $s_{1cLx}(t)$ when received from a specific $x^{th}$ layer of the de-collider 200, designated with a general subscript "L" or a specific subscript "L" and numeral (1, 2, 3, x, m, n, etc.), respectively.

A second multiplexer 260b adds the sum of prior estimated signals $\Sigma_{(x-1)}[n]$ to the estimated signal for the given branch 250x to produce a summed signal $\Sigma_x[n]$, A first branch 250a may omit the second multiplexer 260b, as the first estimated digital signal $s_{1e}[n]$ produced by the re-encoder 255 represents the sum of all prior estimated signals. A second branch 250b, however, produces a second estimated digital signal $s_{2e}[n]$ from the decoded second packet $d_2$ (from the first branch 250a), and adds the first estimated digital signal $s_{1e}[n]$ to the second estimated digital signal $s_{2e}[n]$ to produce the second summed signal $\Sigma_2[n]$. Continuing the example, in a third branch 250c, the receiver 235 produces the third estimated signal $s_{3e}[n]$ from the decoded third packet $d_3$ (from the second branch 250b), and adds the sum of the prior estimated signals $\Sigma_2[n]$ from the second branch 250b to produce a third summed signal $\Sigma_3[n]$. Each branch $250_{a-m}$ passes the associated summed signal $\Sigma_x[n]$ to the next branch $250(x+1)$ in the de-collider 200 for estimating the linear interference effects of the prior packets on the given packet.

A linear estimator 265 receives the summed signal $\Sigma_x[n]$, amplifies the summed signal $\Sigma_x[n]$ by the gain Gx-RF, and process the summed signal $\Sigma_x[n]$ to produce the linear interference component at time $n_x$ so that the de-collider 200 may remove the (estimated) effects of the first through $(x-1)^{th}$ component signals s(t) from the $x^{th}$ de-interfering pathway. The linear estimator 265 may be trained offline (i.e., using known input signals as per method 400 discussed in relation to FIG. 4) or online (i.e., using "live" or unknown input signals as per method 600 in relation to FIG. 6). The linear estimator 265 provides the digital linear interference component $s_{xe}[n]$ (optionally to an upsampler 270 and) to the DAC 275 to convert the digital signal into an analog signal for comparison with the analog collided signal $s_{xc}(t)$ for the given branch 250x. In some embodiments, the second branch 250b provides the digital linear interference component $s_{xe}[n]$ to the receiver 235b for the second branch 250b.

The optional upsampler 270 increases the sampling rate of the output of the linear estimator 265. In some embodiments, the upsampler 270 produces an expanded version in which the upsampled values match the output values, changing when the output value changes. For example, from time $t_0$ to $t_3$, the output of the linear estimator 265 may be $s_{xe}[n_0]=1/$TRUE and from time $t_4$ to $t_7$ may be $s_{xe}[n_1]=0/$FALSE, and the upsampler 270 produces expanded series of [1,1,1,1,0,0,0,0] from time $t_0$-$t_7$ that includes more values (e.g., four instances of 1/TRUE and four instances of 0/FALSE as opposed to one instance of each) to allow for the DAC 275 to manipulate more data when synthesizing an analog signal from a digital signal.

The DAC 275 synthesizes the $x^{th}$ estimated signal $s_{xe}[n]$ into an analog linear interference component $s_{xe}(t)$, which the third multiplexer 260c subtracts from the given collided signal $s_{xc}(t)$ (as delayed and amplified) to produce a partially de-interfered second signal $s_{xp}(t)$. The third multiplexer 260c includes a first minuend input, that accepts the delayed and amplified second collided signal Gx-RF*$s_{xc}(t)$, and a first subtrahend input that accepts the estimated analog linear interference component $s_{xe}(t)$. Each of the third and fourth multiplexers 260c-d may be multiplexers that provide signals at the subtrahend inputs to negatively interfere with (e.g., cancel out a portion of) the signal input at the minuend inputs. The partially de-interfered signal $s_{xp}(t)$ may be represented according to Formula 10.

$$s_{xp}(t) = GxRF * s_{xc}(t) - GxRF * \sum_{y=1}^{x-1} \hat{h}_y[n] * \hat{s}_y[n] \quad (10)$$

In the de-interfering pathway, the amplifier 220 receives the collided signal $s_{xc}(t)$ from the splitter 210 and applies a gain Gx-RF to the collided signal $s_{xc}(t)$. The first delay element 280a temporally aligns the inputs to the third multiplexer 260c so that the linear interference component associated with time $t_x$ is subtracted from the amplified collided signal Gx*$s_{xc}(t)$ associated with time $t_x$. As each branch 250 in the de-collider 200 takes the output of earlier branches 250 as input, the amount of delay imparted by the first delay element 280a may increase in later branches 250 to account for additional processing time in earlier branches 250.

The gains applied by successive branches 250 in the de-collider 200 are progressively larger than earlier branches 250 in the de-collider 200. For example, a first branch 250a applies a gain G2 greater than the gain G1 on the primary receiver pathway to preserve the relative positive/negative values of the second collided signal $s_{2c}(t)$ in the partially de-interfered second signal $s_{2p}(t)$ when the analog linear interference component $s_{1e}(t)$ is removed by the third multiplexer 260c (i.e., G1<G2-RF).

A nonlinear estimation line connects the third node 230 with the de-interfering pathway at the fourth multiplexer 260d. The digital delay element 280b may be located before or after the nonlinear estimator 285 in various embodiments, and synchronizes the output of the determination of the nonlinear interference component $f_{xNL}[n]$ with the determination of the linear interference component $s_{xe}(t)$ on the linear estimation line so that the de-interfering pathway removes the nonlinear and linear interference components of the same time window from the $x^{th}$ collided signal $s_{xc}(t)$. For example, the nonlinear estimator 285 in each branch 250 determines the nonlinear interference component $f_{1NL}[n]$ of the first digitized signal $s_{1d}[n]$ at time $t_0$ and the linear estimation line (including the third multiplexer 260c and ADC 225x) takes until time $t_1$ to remove the given synthesized signal $s_{xs}(t)$ from the given collided signal $s_{xc}(t)$ and digitize the output as the given partially de-interfered signal $s_{xp}[n]$, the second delay element 280b delays the output of the nonlinear interference component by $\Delta(t_1-t_0)$. In various embodiments, the second delay element 280b may be a discrete or an integrated component (e.g., a first-in-first-out register).

In various embodiments, the nonlinear estimator 285 is a FFANN (Feed Forward Artificial Neural Network). The nonlinear estimator 285 receives inputs of the first digitized signal $s_{1d}[n]$ over q time periods of [n], and uses the current and historic values for $s_{1d}[n]$ to $s_{1d}[n-q]$ on the primary receiver pathway to estimate the nonlinear interference component of the prior component signals s[n] and the current component signal $s_{xc}[n]$ on the de-interfering signal pathway. As new values for $s_{1d}[n]$ are received, the older values are cycled out (e.g., $s_{1d}[n]$ at time $t_0$ becomes $s_{1d}[n-1]$ at time $t_1$, which become $s_{1d}[n-2]$ at time $t_2$, etc.). The nonlinear estimator 285 weights the various input values, and the values of various hidden nodes that associate the various inputs together before producing the estimated nonlinear interference component for the given line $\hat{f}_{xnL}[n]$. The de-collider 200 may train the weights used by the nonlinear estimator 285 offline (i.e., using known input signals as per method 400 discussed in relation to FIG. 4) or online (i.e., using "live" or unknown input signals as per method 600 in relation to FIG. 6).

After the third multiplexer 260c removes the analog linear interference component $s_{xe}(t)$ from the collided signal $s_{xc}(t)$ on the de-interfering signal pathway, the ADC 225 digitizes the partially de-interfered signal $s_{xp}(t)$, and feeds the digitized partially de-interfered signal $s_{xp}[n]$ to the minuend input of the fourth multiplexer 260d. The fourth multiplexer 260d receives the nonlinear interference component $f_{xNL}[n]$ from the nonlinear estimator 285, and produces the de-interfered signal $s_{xi}[n]$ at the difference output, which may be represented according to Formula 11, where R represents a residual interference of the $f_{2NL}[n]$ on the de-interfering signal pathway (i.e., $f_{xNL}[n]-\hat{f}_{xNL}[n]$).

$$s_{xi}[n]=Gx*h_x[n]*s_x[n]+v_x+R \quad (11)$$

By removing the linear interference component as an analog signal $s_{xe}(t)$ prior to digitizing the given collided signal $s_{xc}(t)$, the de-collider 200 may set the gain Gx-RF such that the amplitude of the partially de-interfered signal $s_{xp}(t)$ is matched to the operating range of the ADC 225x in the given branch 250x, allowing the de-collider 200 to use a larger portion of the range of the ADC 225x (compared to embodiments that feed a digitized version of the second collided signal $s_{xd}[n]$ to the multiplexers 260), and thus reduce the noise $v_x$ introduced by the ADC 225x. Additionally, the gain Gx-BB applied by the ADC 225x is selected so that the amplitude of the resulting de-interfered signal $s_{xi}(t)$ preserves the relative positive/negative values of the second collided signal $s_{xc}(t)$ once the nonlinear interference is removed. In some embodiments, the gain Gx-BB is set greater than the gain Gx-1 applied on a prior branch 250 or the primary receiver pathway according to Formula 12, while in other embodiments, the gain Gx-BB is set is set according to Formula 13.

$$G(x-1)<Gx\text{-}BB \quad (12)$$

$$\min(Gx\text{-}BB* s_{xp}(t))-\max(G(x-1)*s_{(x-1)c}(t))>0 \quad (13)$$

The receiver 235x receives the de-interfered signal $s_{xi}[n]$ and decodes the given packet from the given de-interfered signal $s_{xi}[n]$ onto a second output as decoded given packet $d_x$. In various embodiments, the first receiver 235a and the branch receivers 235x are separate input channels of a single receiver 235, while in other embodiments, the first receiver 235a and each of the branch receivers 235x are discrete receivers 235.

Figure 3A:
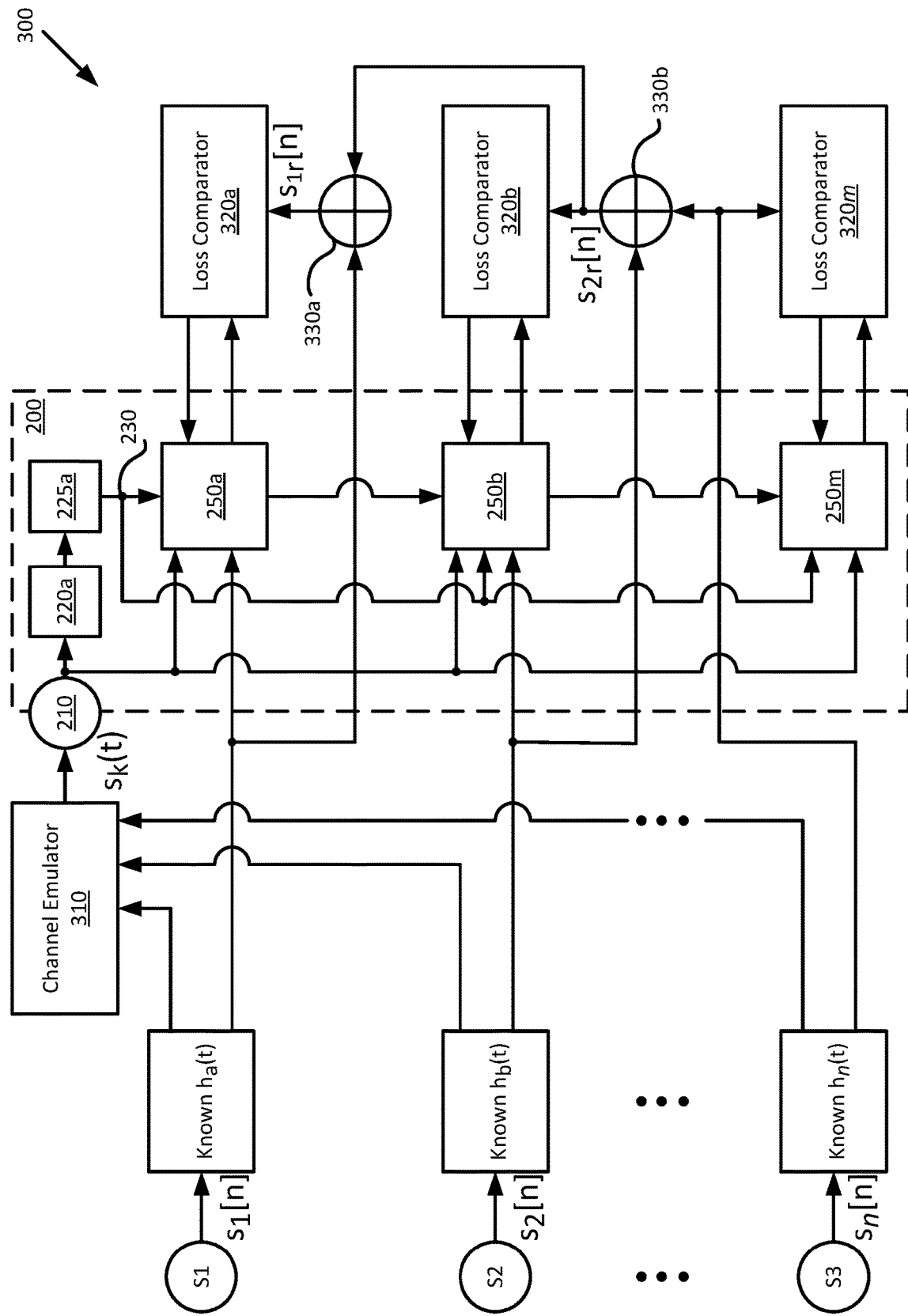
FIGS. 3A-3C illustrate arrangements of an offline training circuit for use with a de-collider, according to embodiments of the present disclosure.
Figure 3B:
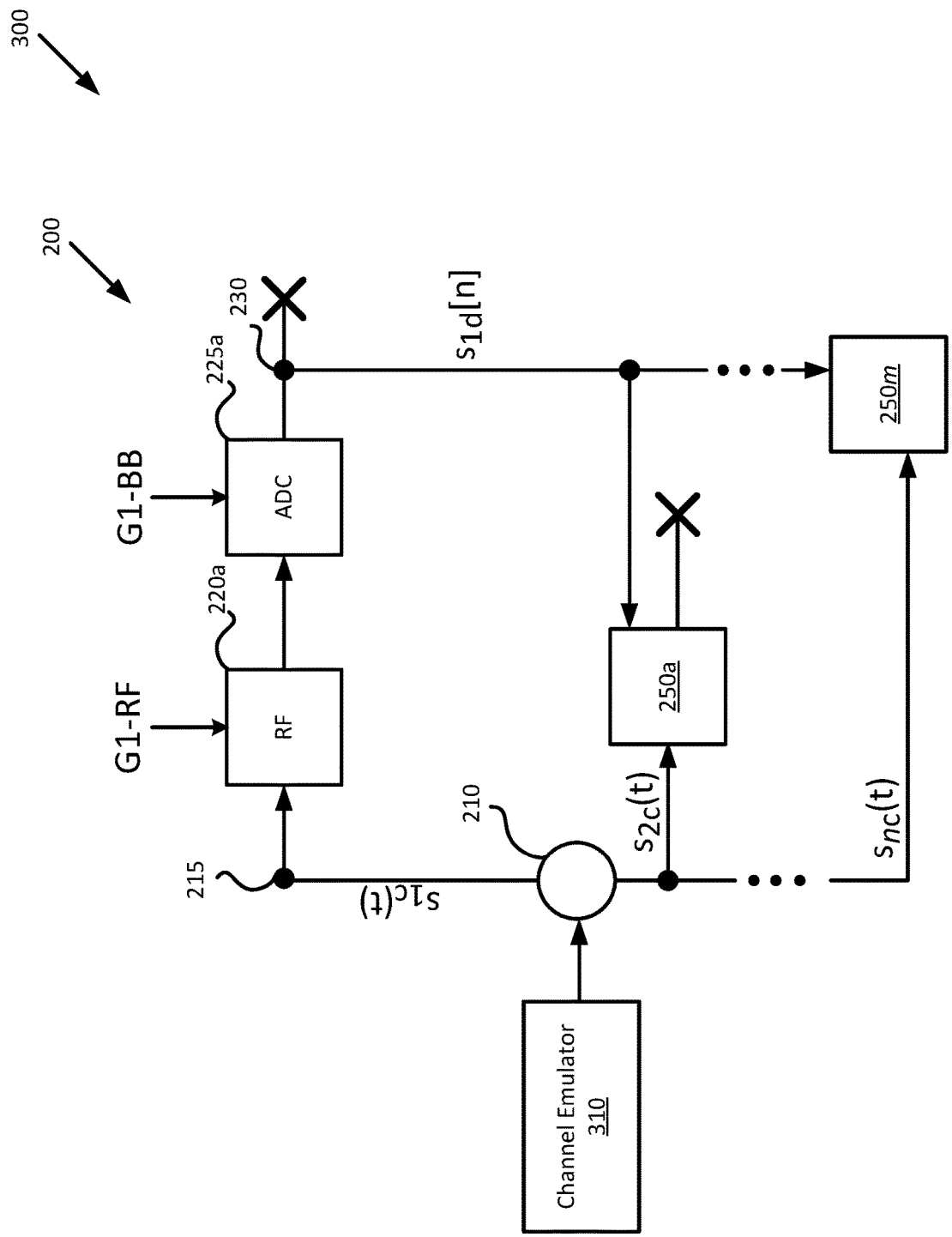
Figure 3C:
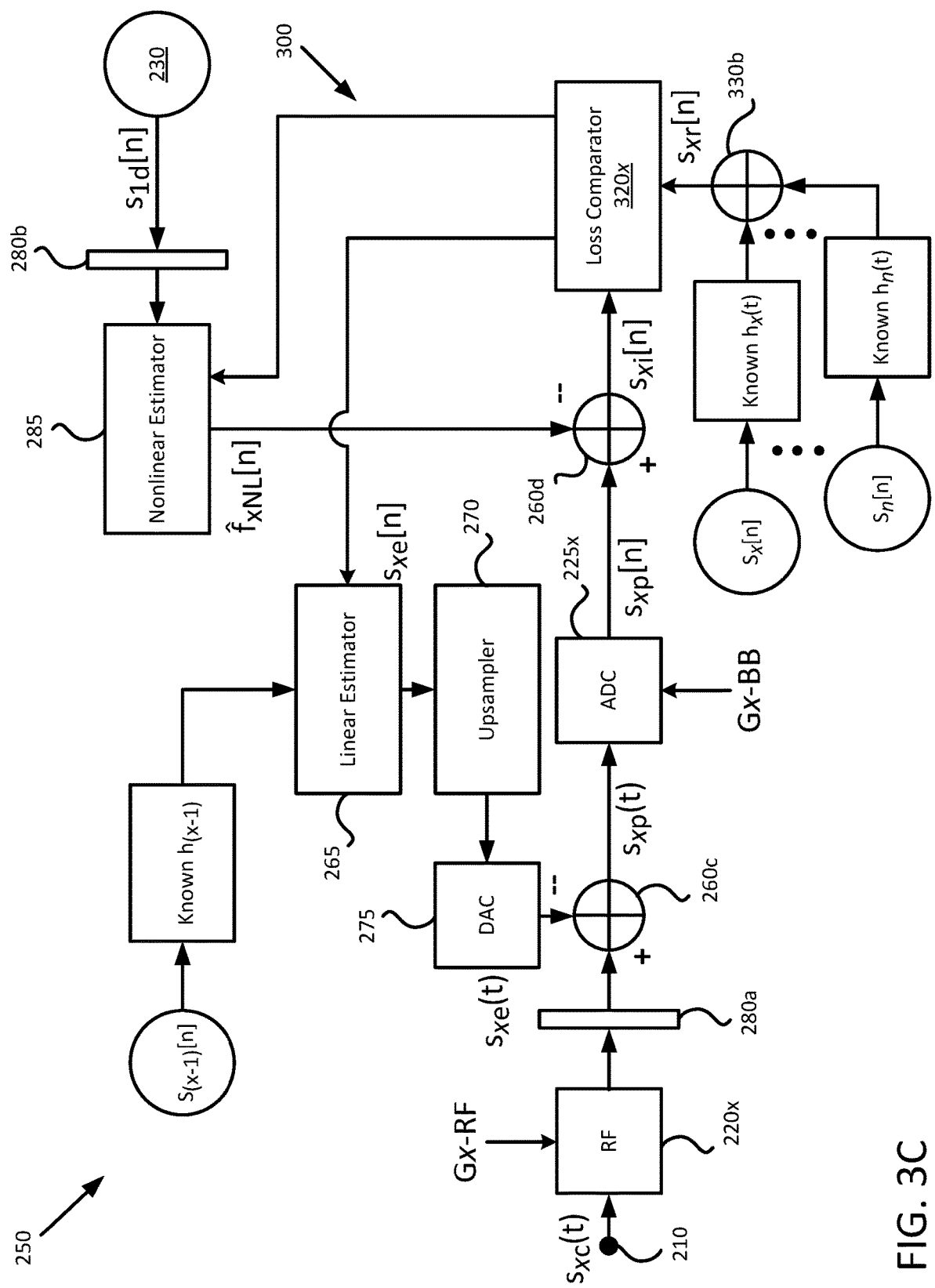

FIGS. 3A-3C illustrate arrangements of an offline training circuit 300 for use with a de-collider 200, according to embodiments of the present disclosure. FIG. 3A illustrates an overview of the offline training circuit 300, while FIG. 3B illustrates details of the primary receiver pathway and signal propagation from the splitter 210 in an offline training mode, and FIG. 3C illustrates details of a branch 250 in an offline training mode. In various embodiments, the offline training circuit 300 is provided by an external test device during initial setup and training of the de-collider 200, or may be integrated components of the de-collider 200 that the de-collider 200 may selectively engage to initiate an offline training session.

As shown in FIG. 3A, n signal sources $S_{a-n}$ each generate one of n known testing signals $s_{1-n}[n]$, which a channel emulator 310 aggregates and applies associated known simulated channel effects $h_{1-n}(t)$ to, to thereby produce a testing collided signal $s_k(t)$ which is passed to the de-collider 200 via the splitter 210. These known testing signals and the associated known simulated channel effects are passed to various loss comparators 320a-m (generally, loss comparator 320) that compare the known signals and channel effects as generated with the interpreted de-interfered signal $s_{xi}[n]$ produced by each branch 250a-m. In turn, the loss comparators 320 train the linear estimators 265 and nonlinear estimators 285 in the associated branches 250 to better and more accurately interpret the signals processed thereby.

Each loss comparator 320 receives the combined component testing signals used in the current and later branches 250a-m in the series of branches 250. Because de-collision progressively removes the strongest component signals from the collided signal $s_c(t)$, each loss comparator 320 compares the de-interfered signal $s_{xi}[n]$ against a reverse collided signal $s_{xr}[n]$ that includes progressively fewer known testing signals. The loss comparators 320a-m are arranged to construct the corresponding reverse collided signals $s_{xr}[n]$ from the known testing signals in reverse order compared to de-collision; starting with the lowest strength signal and adding progressively stronger component signals thereto. For example, the $m^{th}$ loss comparator 320m receives the $n^{th}$ component signal $s_n[n]$, while the second loss comparator 320b receives the second through $n^{th}$ component signals as a reverse collided test signal $s_{2r}[n]$. Each loss comparator 320a-m therefore includes a testing multiplexer 330 (e.g., a first testing multiplexer 330a, a second testing multiplexer 330b, etc.) to produce a reverse collided test signal $s_{xr}[n]$ according to Formula 14, although the $m^{th}$ loss comparator 320m may exclude such a testing multiplexer 330 in some embodiments as there are no later signals to combine with the $n^{th}$ testing signal $s_n[n]$.

$$s_{xr}[n] = s_x[n] + s_{(x+1)}[n] \ldots + s_n[n] \qquad (14)$$

Each loss comparator 320a-m trains the linear estimator 265 and nonlinear estimator 285 in the associated branch 250a-m based on the differences between the estimated de-interfered signal $s_{xi}[n]$ produced by that branch 250 and the known testing signal(s) to identify how the linear estimator 265 and the nonlinear estimator 285 performed in identifying the interference components in the simulated collided signals. The loss comparator 320 provides a back error propagation signal to the nonlinear estimator 285 to train how the different nodes in the neural network are weighted to estimate the nonlinear interference component. The loss comparator 320 provides a least means squared training signal to the linear estimator 265 to adjust how the linear estimator 265 determines how the prior signals s(t) would affect the given digital signal $s_{xd}[n]$.

FIG. 3B shows that, similarly to online operations of the de-collider 200, the splitter 210 provides the first collided signal $s_{1c}(t)$ to the primary receiver pathway to be amplified and digitized by the first amplifier 220a and first ADC 225a to produce a first digitized signal $s_{1d}[n]$ at the third node 230, and each of the branches 250a-m receive the first digitized signal $s_{1d}[n]$. Every one of the branches 250a-m also receives an associated collided signal $s_{x-n}(t)$ from the splitter 210 similarly to online operations of the de-collider 200.

FIG. 3C illustrates the internal operations of a branch 250 in offline training mode. In contrast to online operations of the de-collider 200, during offline training, the offline training circuit 300 bypasses the receivers 235 and re-encoders 255 (and first and second multiplexers 260a-b) in the branches 250 of the de-collider 200. Instead, the known signals are provided directly to the linear estimators 265 of the individual branches 250. The de-collider pathway still receives the collided signal $s_{xc}(t)$ from the splitter 210 and the first digital signal $s_{1d}[n]$ from the third node 230 on the nonlinear estimation line, but receives the prior training signal $s_{(x-1)}(t)$ as input to the linear estimator 265 that bypasses the re-encoder 255 and the multiplexers 260 associated with other layers and/or the summed signal $\Sigma_x[n]$. The branch 250 produces the de-interfered signal $s_{xi}[n]$ according to these inputs, but instead of providing the de-interfered signal $s_{xi}[n]$ to a receiver 235, provides the de-interfered signal $s_{xi}[n]$ to a loss comparator 320x for the branch 250. The loss comparator 320 compares the de-interfered signal $s_{xi}[n]$ against the known training signal $s_x(t)$ and later signals $s_{(x+1)}(t)$ through $s_n(t)$ that would be still included in the collided signal $s_c(t)$ during online operations (i.e., not removed for de-interference by earlier branches $205_{a-(x-1)}$).

The loss comparator 320 uses the difference between the de-interfered signal $s_{xi}[n]$ and the reverse collided signal $s_{xi}[n]$ to train the linear estimator 265 and the nonlinear estimator 285. In various embodiments, the loss comparator 320 provides a least means squared training signal to the linear estimator 265 to adjust how the linear estimator 265 determines how the prior signals s(t) would affect the given digital signal $s_{xd}[n]$. In various embodiments, the loss comparator 320 provides a back error propagation signal to the nonlinear estimator 285 to train how the different nodes in the neural network are weighted to estimate the nonlinear interference component.

Figure 4:
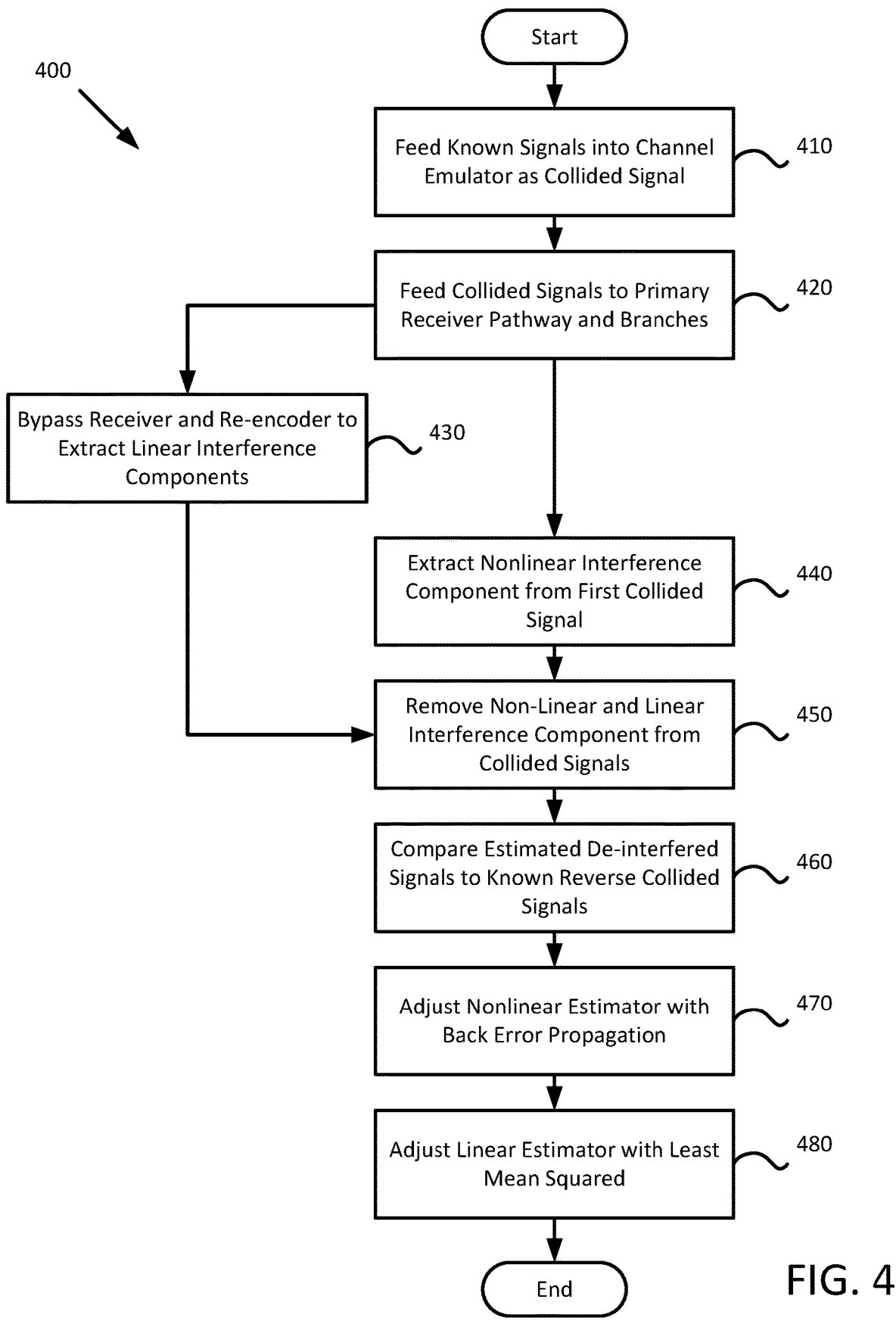
FIG. 4 is a flowchart for offline training of a de-collider, according to embodiments of the present disclosure.

FIG. 4 is a flowchart of a method 400 for offline training of a de-collider 200, as may be practiced with a de-collider 200 using an offline training circuit 300 as described in relation to FIGS. 3A-3C, according to embodiments of the present disclosure. Method 400 begins with block 410, where the first through $n^{th}$ known signal sources S1-Sn feed first through $n^{th}$ known signals $s_1[n]$-$s_n[n]$ carrying known packets to a channel emulator 310. In some embodiments, the known signals $s_1[n]$-$s_n[n]$ are digital signals that the channel emulator 310 converts into analog signals, while in other embodiments, the known signal sources S1-Sn produce analog known signals $s_{1-n}(t)$. The channel emulator 310 applies known channel effects to the known signals $h_1(t)$-$h_n(t)$ affecting the known training signals and collides the resulting signals into a collided signal $s_k(t)$.

At block 420, the channel emulator 310 and/or splitter 210 feeds the collided signal $s_k(t)$ as several individual collided signals $s_{xc}(t)$ onto the various signal processing paths of the de-collider 200. The channel emulator 310 places a first collided signal $s_{1c}(t)$ onto a primary receiver pathway with emulated channel effects (e.g., $h_1(t)$-$h_n(t)$) affecting the known training signals $s_1(t)$-$s_n(t)$). Similarly, the channel emulator 310 places the second through $n^{th}$ collided signals $s_{2c}(t)$-$s_{nc}(t)$ onto the first through $m^{th}$ branches 250a-m with the emulated channel effects affecting the corresponding training signals $s_1(t)$-$s_n(t)$ included therein. In each branch 250a-m, the de-collider 200 extracts the linear interference component $s_{xe}(t)$ of the earlier component signal $s_{(x-1)}(t)$ on the current component signal $s_x(t)$ via a linear estimator 265.

At block 430, the offline training circuit 300 bypasses the receivers 235 and the re-encoder 255 in the branches 250 to provide the known signals $s_{(x-1)}(t)$ directly to the linear estimators 265x to determine the linear interference component of a prior known signal $s_{(x-1)}(t)$ on the current known signal $s_x(t)$. In various embodiments, the de-collider 200 and offline training circuit 300 may bypass the receivers 235 and re-encoders 255 by using alternatively switched pathways to route signals around the receivers 235 and re-encoders 255. In other embodiments, the de-collider 200 and offline training circuit 300 may bypass the receivers 235 and re-encoders 255 by placing the receivers 235 and re-encoders 255 into a feed-through mode to output signals as received without manipulation or analysis.

At block 440, the de-collider 200 extracts the (training) nonlinear interference component (e.g., $\hat{f}_{1NL}(h_1[n]*s_1[n], h_2[n]*s_2[n], \ldots h_n[n]*s_n[n])$) from the first digitized signal $s_{1d}[n]$. As in normal operations (e.g., per method 100), the de-collider 200 amplifies and digitizes the first collided signal $s_{1c}(t)$ to produce a first digitized signal $s_{1d}[n]$ on the primary receiver pathway, and feeds the first digitized signal $s_{1d}[n]$ to a nonlinear estimator 285. In various embodiments, the de-collider 200 uses a FFANN as a nonlinear estimator 285 to estimate the real and imaginary components of a given time or time window for the nonlinear interference component of the encoded first packet on the other packets. In various embodiments, during normal operations, the output of the nonlinear estimator 285 (or input thereto) is delayed based on the processing time to extract the estimated linear interference component (e.g., according to block 140 in method 100), but the delay in method 400, during offline training operations, may be set for a time less than that used in method 100, as the offline training circuit 300 bypasses the receivers 235 and re-encoders 255.

At block 450, the de-collider 200 removes the (training) linear and nonlinear interference components from the second collided signal on the branch to produce (training) de-interfered signals. Each branch 250x removes the linear interference component of the known signal for the prior branch 250(x−1) (or for the first branch 250a, the known first signal $s_1[n]$) as an analog signal $s_{xe}(t)$ from the collided signal $s_{xc}(t)$, and the linear interference component from the partially de-interfered signal $s_{xp}[n]$ to produce the de-interfered signal $s_{xi}[n]$.

At block 460, the loss comparators 320a-m associated with the corresponding branches 250a-m determine the difference between the de-interfered signal $s_{xi}[n]$ and the known reverse collided signal $s_{xr}[n]$. The reverse collided signal $s_{xr}[n]$ is based on the signals $s_{x-n}[n]$ as collided and the known channel effects and gains applied to the signals (e.g., the residual error or noise on the signal pathways). Ideally, the difference between the two values is as small as possible, and the loss comparator 320x trains the linear estimator 265 and the nonlinear estimator 285 to minimize the difference between the de-interfered signal $s_{xi}[n]$ and the known reverse collided signal $s_{xr}[n]$ across one or more iterations.

At block 470, the loss comparator 320x adjusts the nonlinear estimator 285 via a back error propagation of the difference to the neural network. At block 480, the loss comparator 320x adjusts the linear estimator 265 via a least mean squared difference. Method 400 may then conclude or repeat for additional rounds of training using new or the same instances of the known signals $s_1[n]$-$s_n[n]$.

Figure 5:
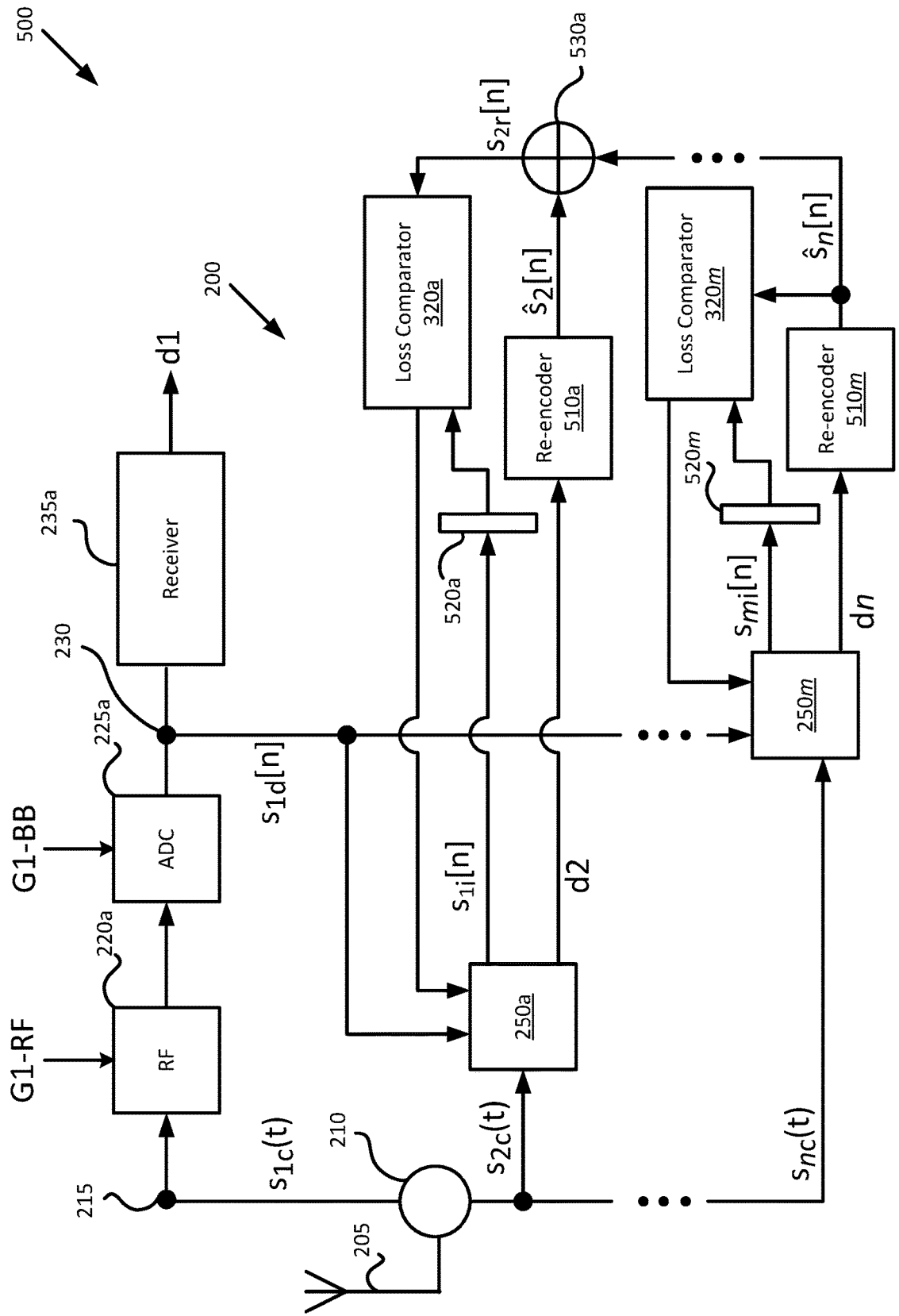
FIG. 5 illustrates an arrangement of an online training circuit for use with a de-collider, according to embodiments of the present disclosure.

FIG. 5 illustrates an arrangement of an online training circuit 500 for use with a de-collider 200, according to embodiments of the present disclosure. The online training circuit 500 can be constantly or selectively used during normal operations of the de-collider 200 to provide training to the linear estimators 265 and nonlinear estimators 285 used in de-colliding signals. Although illustrated in regard to a single layer, in other embodiments, the online training circuit 500 may be applied to several de-colliders 200 arranged to interpret spatially separated signals for analysis. Live signals, having values that are unknown to the de-collider 200 prior to decoding and de-colliding, are de-coded and de-collided as discussed in relation to method 100 in FIG. 1, and the resulting outputs are used to train the nonlinear estimators 285 and the linear estimator 265 in the respective branches 250.

The online training circuit 500 accepts the decoded packets $d_2$-$d_n$ and the de-interfered signals $s_{2i}[n]$-$s_{mi}[n]$ from each of the branches 250a-m in the de-collider 200 as inputs. A training re-encoder 510x associated with each branch 250x re-encodes the associated decoded packet $d_x$ into an estimated digital signal $\hat{s}_x[n]$ that estimates or approximates the channel effects and the corresponding component signal $s_x[n]$ that produced the decoded packet $d_x$.

A digital delay 520a-m receives and synchronizes the de-interfered second signal $s_{xi}[n]$ from the corresponding branch 250a-m with the output of the corresponding training re-encoder 510a-m to account for the time to process the decoded packet $d_2$-$d_n$.

The loss comparator 320 determines the difference between the second estimated signals $\hat{s}_x[n]$ and the corresponding de-interfered signal $s_{xi}[n]$ as delayed to identify how the linear estimator 265x and the nonlinear estimator 285 performed in identifying the interference components of the given packet on the other packets in the collided signal. The loss comparator 320x provides a back error propagation signal to the associated nonlinear estimator 285x to train how the different nodes in the neural network are weighted to estimate the nonlinear interference component. The loss comparator 320x provides a least means squared training signal to the linear estimator 265 to adjust how the linear estimator 265 determines how the signal $s_x(t)$ would affect the other signals.

Figure 6:
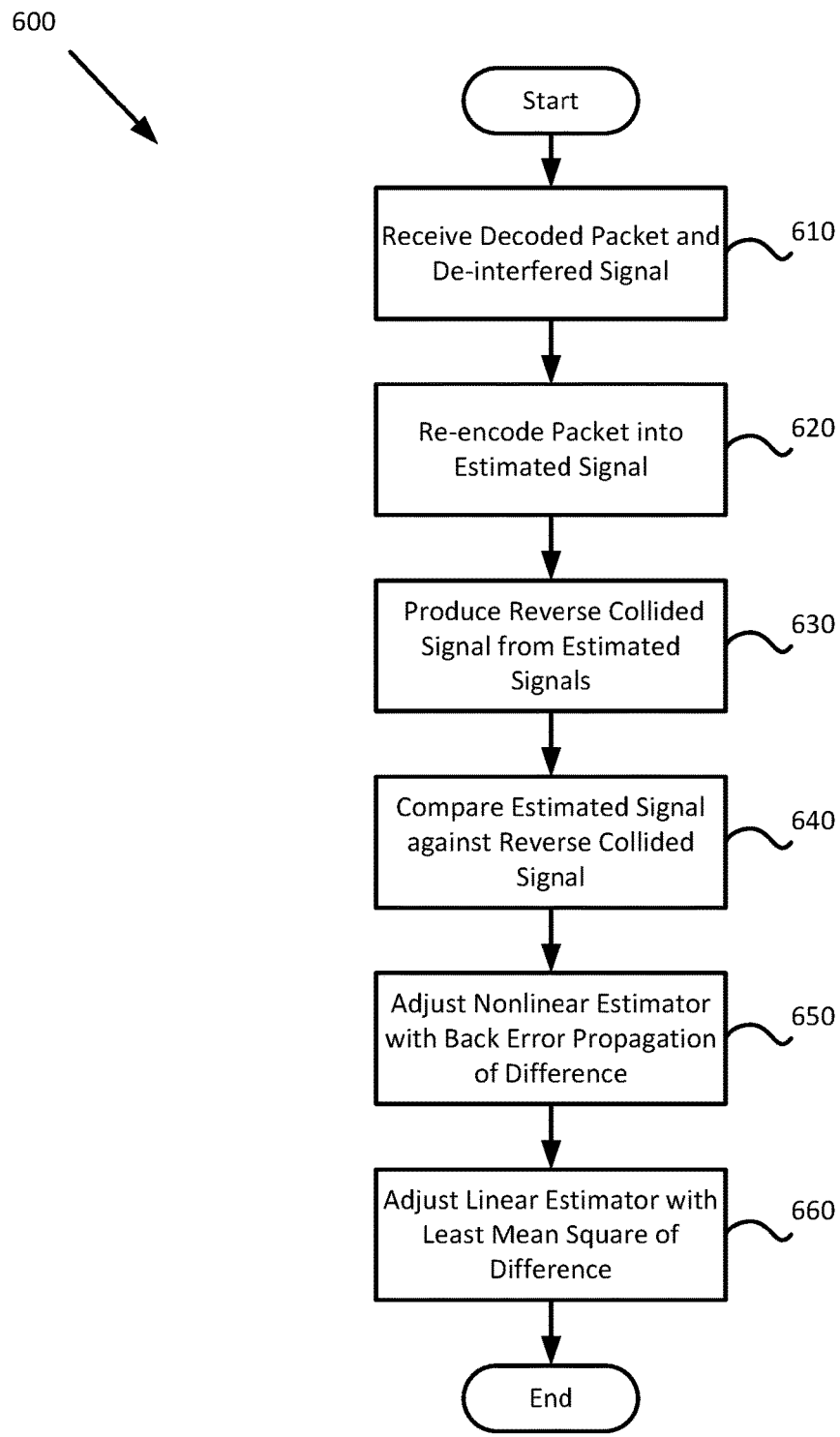
FIG. 6 is a flowchart for online training of a de-collider, according to embodiments of the present disclosure.

FIG. 6 is a flowchart of a method 600 for offline training of a de-collider 200, as may be practiced with a de-collider 200 using an online training circuit 500 as described in relation to FIG. 5, according to embodiments of the present disclosure. Method 600 is performed "online" in succession to or in parallel with method 100 as described in relation to FIG. 1 to de-collide signals. Method 600 begins with block 610, where the online training circuit 500 receives a decoded packet (e.g., $d_2$, $d_3$, $d_n$) and the de-interfered second signal (e.g., $s_{2i}[n]$, $s_{3i}[n]$, $s_{ni}[n]$) from the branches 250a-m of the de-collider 200 during normal operations. During online training, the de-collider 200 receives live signals with values that are unknown to the de-collider 200 prior to decoding and de-colliding.

At block 620, the online training circuit 500 re-encodes the decoded packets into estimated signals (e.g., $\hat{s}_x[n]$) that approximate estimated channel effects (e.g., $\hat{h}_x(t)$) on the component signal (e.g., $s_x(t)$) as received in the collided signal $s_{xc}(t)$.

At block 630, the online training circuit 500 produces the reverse collided signals $s_{2r}[n]$-$s_{nr}[n]$ for each loss comparator 320a-m by adding the subsequent estimated signals with the current estimated signal $s_x[n]$, such as according to Formula 15.

$$s_{xr}[n]=\hat{s}_x[n]+\hat{s}_{(x+1)}[n]+\hat{s}_{(x+2)}[n] \ldots +\hat{s}_n[n] \quad (15)$$

Reverse collided signals $s_{xr}[n]$ associated with earlier loss comparators 320 and branches 250 aggregate more estimated signals $\hat{s}_x[n]$ than the reverse collided signals $s_{xr}[n]$ associated with subsequent loss comparators 320 and branches 250. For example, the second reverse collided signal $s_{2r}[n]$ includes the second through $n^{th}$ estimated signals $\hat{s}_2[n]$-$\hat{s}_n[n]$, the third reverse collided signal $s_{3r}[n]$ includes the third through $n^{th}$ estimated signals $\hat{s}_3[n]$-$\hat{s}_n[n]$, etc. As will be appreciated, as the $n^{th}$ reverse collided signal $s_{nr}[n]$ is equal to the $n^{th}$ estimated signal $\hat{s}_n[n]$, as there are no signals subsequent to the $n^{th}$ estimated signal $\hat{s}_n[n]$.

At block 640, the online training circuit 500 compares the reverse collided signals $s_{xr}[n]$ against the corresponding de-interfered signals $d_{xi}[n]$. In various embodiments, to compensate for the time needed to decode and re-encode the packets $d_2$-$d_n$ into the estimated signals $\hat{s}_2[n]$-$\hat{s}_n[n]$, the online training circuit 500 delays (e.g., via a digital delay 520) the de-interfered signals $s_{2i}[n]$-$s_{ni}[n]$ to match the time windows of each signal. The loss comparators 320a-m determine the differences between the corresponding reverse collided signals $s_{xr}[n]$ and de-interfered signals $d_{xi}[n]$ from the associated branches 250a-m. At block 650, the loss comparators 320a-m adjust the nonlinear estimators 285 in the associated branches 250a-m via back error propagation of the difference to the neural network. At block 660, the loss comparators 320a-m adjust the linear estimators 265 in the associated branches 250a-m via least mean square of the difference. Method 600 may then conclude or repeat for additional rounds of training.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A system, comprising:
   a primary receiver pathway, configured to digitize and amplify a collided signal including a plurality of packets at a first gain to produce a first digitized signal;
   a primary receiver, configured to decode a first packet of the plurality of packets from the collided signal as digitized and amplified by the primary receiver pathway;
   a plurality of branches arranged in cascading sequence from the primary receiver pathway, wherein each branch is configured to extract a given packet and comprises:
      a linear estimation line configured to estimate a given linear interference component of one or more prior packets to the given packet on the collided signal;
      a nonlinear estimation line configured to estimate a given nonlinear interference component of the one or more prior packets to the given packet on the collided signal;
      a packet extraction pathway configured to remove the given linear interference component and the given nonlinear interference component from the collided signal to produce a given de-interfered signal; and
      a branch receiver configured to decode the given packet of the plurality of packets from the given de-interfered signal.

2. The system of claim 1, wherein the nonlinear estimation line includes:
   a nonlinear estimator, comprising a feed forward artificial neural network trained by a back error propagation training signal to determine the given nonlinear interference component; and
   a digital delay line, configured to delay input to the nonlinear estimator based on a processing time of the nonlinear estimation line of a given branch.

3. The system of claim 1, wherein the linear estimation line includes:
   a re-encoder, configured to produce a re-encoded digital signal based on a prior packet to the given packet;
   a linear estimator, trained according to a least mean squared training signal to determine the given linear interference component of one or more prior packets to the given packet on the collided signal; and
   a digital to analog converter (DAC) configured to synthesize the given linear interference component into an analog linear interference component.

4. The system of claim 3, wherein the linear estimation line further comprises:
   a multiplexer, configured to combine the re-encoded digital signal based on the prior packet to the given packet with a prior estimated signal from a spatially separated layer of the system.

5. The system of claim 3, wherein the linear estimation line further comprises:
   a multiplexer, configured to combine the re-encoded digital signal based on the prior packet to the given packet with a sum of prior estimated signals to a component signal carrying the given packet.

6. The system of claim 1, wherein the packet extraction pathway includes:
   a first subtractor, configured to remove the given linear interference component from the collided signal to produce a given partially de-interfered signal;
   an analog delay line, configured to delay the collided signal from the first subtractor based on a processing time of the linear estimation line;
   an analog to digital converter (ADC), configured to amplify the given partially de-interfered signal by a baseband gain portion of the given gain; and
   a second subtractor, configured to remove the given nonlinear interference component from the given partially de-interfered signal.

7. The system of claim 1, wherein the plurality of branches includes a first de-collider branch that decodes a second packet from the collided signal and a second de-collider branch that decodes a third packet from the collided signal, wherein the second de-collider branch applies a second gain that is higher than a first gain applied by the first de-collider branch.

8. The system of claim 1, further comprising an offline training circuit, the offline training circuit comprising:
   a plurality of known signal sources, configured to produce a plurality of known signals;
   a channel emulator, configured to receive the plurality of known signals, apply a corresponding plurality of known channel effects to the plurality of known signals to produce a known collided signal, and feed the known collided signal to the primary receiver pathway and the plurality of branches;
   a plurality of loss comparators corresponding to the plurality of branches, wherein each loss comparator corresponds to a given branch and is configured to:
      receive a given reverse collided signal including a given known signal from a corresponding known signal source and subsequent known signals from subsequent corresponding known signal sources;
      receive a given de-interfered signal from a corresponding branch; and
      provide training signals to the linear estimation line and the nonlinear estimation line based on a difference between the given de-interfered signal and the given reverse collided signal.

9. The system of claim 1, further comprising an online training circuit, the online training circuit comprising:
   a plurality of loss comparators corresponding to the plurality of branches, configured to provide training signals to the linear estimation line and the nonlinear estimation line based on a difference between the given de-interfered signal and a given reverse collided signal;

a plurality of training re-encoders corresponding to the plurality of loss comparators, configured to receive the given packet as decoded from a corresponding branch to produce a reverse collided signal based on the given packet as decoded and decoded packets from subsequent branches in the plurality of branches; and a plurality of delay elements corresponding to the plurality of loss comparators, configured to receive the given de-interfered signal from the corresponding branch and delay input of the given de-interfered signal to a corresponding loss comparator based on a processing time of a corresponding training re-encoder.

10. The system of claim 1, further comprising:

a first antenna connected to the primary receiver pathway and the plurality of branches by a splitter; and a second antenna, spatially separated from the first antenna, connected to a second primary receiver pathway and a second plurality of branches by a second splitter, wherein individual branches of the plurality of branches and individual branches of the second plurality of branches share digital linear interference components on corresponding linear estimation lines.

11. A method, comprising:

receiving a collided signal, the collided signal comprising a plurality of signals that each carry a packet of a corresponding plurality of packets;

for a first signal of the plurality of signals that includes a first packet:
  amplifying and digitizing the collided signal into a first digital signal at a first gain; and
  decoding the first packet from the first digital signal;

for each signal of the plurality of signals other than the first signal, carrying a given packet:
  estimating a given linear interference component and a given nonlinear interference component of one or more prior packets to the given packet on the collided signal;
  removing the given linear interference component and the given nonlinear interference component from the collided signal to produce a given de-interfered signal; and
  decoding the given packet of the plurality of packets from the given de-interfered signal.

12. The method of claim 11, further comprising:

receiving a second collided signal spatially separated in a second layer from a first layer in which the collided signal is received, the second collided signal comprising the plurality of signals;

in the second layer, for the first signal of the plurality of signals, carrying the first packet:
  amplifying and digitizing the second collided signal into a first layered digital signal at a first gain of the second layer; and
  decoding the first packet from the first digital signal in the second layer, for each signal of the plurality of signals beyond the first signal, carrying a corresponding packet:
  producing a corresponding linear interference component based on one or more prior packets to the packet on the second collided signal and the one or more prior packets to the given packet on the collided signal from the first layer;
  producing a corresponding nonlinear interference component of the one or more prior packets to the corresponding packet on the second collided signal;
  removing the corresponding linear interference component from the second collided signal to produce a corresponding partially de-interfered signal;
  digitizing and amplifying the corresponding partially de-interfered signal at a corresponding gain greater than the first gain of the second layer;
  removing the corresponding nonlinear interference component from the corresponding partially de-interfered signal to produce a corresponding de-interfered signal; and
  decoding the corresponding packet of the plurality of packets from the given de-interfered signal.

13. The method of claim 11, wherein each gain by which a partially de-interfered signal for a given signal of the plurality of signals is amplified is progressively stronger for in subsequent signals of the plurality of signals than earlier signals of the plurality of signals, wherein the partially de-interfered signal comprises the collided signal from which the given linear interference component, but not the given nonlinear interference component, has been removed.

14. The method of claim 11, further comprising, before receiving the collided signal, training nonlinear estimators and linear estimators offline.

15. The method of claim 11, further comprising, training nonlinear estimators and linear estimators offline by:

producing a reverse collided signal from the given decoded packet and any subsequent decoded packets as re-encoded;

determining a difference between the given de-interfered signal and the given reverse collided signal;

adjusting a given nonlinear estimator with back error propagation based on the difference; and adjusting a given linear estimator with a least mean square based on the difference.

16. A non-transitory computer readable storage medium, including instructions that when executed by a processor enable the processor to perform an operation comprising:

receiving a collided signal, the collided signal comprising a plurality of signals that each carry a corresponding packet of a plurality of packets;

for a first signal of the plurality of signals that includes a first packet:
  amplifying and digitizing the collided signal into a first digital signal at a first gain; and
  decoding the first packet from the first digital signal;

for each signal of the plurality of signals other than the first signal, carrying a given packet:
  estimating a given linear interference component and a given nonlinear interference component of one or more prior packets to the given packet on the collided signal;
  removing the given linear interference component and the given nonlinear interference component from the collided signal to produce a given de-interfered signal; and
  decoding the given packet of the plurality of packets from the given de-interfered signal.

17. The non-transitory computer readable storage medium of claim 16, wherein the operation further comprising:

receiving a second collided signal spatially separated in a second layer from a first layer in which the collided signal is received, the second collided signal comprising the plurality of signals that each carry the corresponding packet;

in the second layer, for the first signal of the plurality of signals, carrying the first packet:

amplifying and digitizing the second collided signal into a first layered digital signal at a first gain of the second layer; and decoding the first packet from the first digital signal in the second layer, for each signal of the plurality of signals beyond the first signal, carrying a corresponding packet:

producing a corresponding linear interference component based on one or more prior packets to the corresponding packet on the second collided signal and the one or more prior packets to the given packet on the collided signal from the first layer;

producing a corresponding nonlinear interference component of the one or more prior packets to the corresponding packet on the second collided signal;

removing the corresponding linear interference component from the second collided signal to produce a corresponding partially de-interfered signal;

digitizing and amplifying the corresponding partially de-interfered signal at a corresponding gain greater than the first gain of the second layer;

removing the corresponding nonlinear interference component from the corresponding partially de-interfered signal to produce a corresponding de-interfered signal; and decoding the corresponding packet of the plurality of packets from the given de-interfered signal.

18. The non-transitory computer readable storage medium of claim 16, wherein each gain by which a partially de-interfered signal for a given signal of the plurality of signals is amplified is progressively stronger for in subsequent signals of the plurality of signals than earlier signals of the plurality of signals, wherein the partially de-interfered signal comprises the collided signal from which the given linear interference component, but not the given nonlinear interference component, has been removed.

19. The non-transitory computer readable storage medium of claim 16, the operation further comprising, before receiving the collided signal, training nonlinear estimators and linear estimators offline.

20. The non-transitory computer readable storage medium of claim 16, further comprising, training nonlinear estimators and linear estimators offline by:

producing a reverse collided signal from the given decoded packet and any subsequent decoded packets as re-encoded;

determining a difference between the given de-interfered signal and the given reverse collided signal;

adjusting a given nonlinear estimator with back error propagation based on the difference; and adjusting a given linear estimator with a least mean square based on the difference.

\* \* \* \* \*

UNITED STATES PATENT AND TRADEMARK OFFICE
CERTIFICATE OF CORRECTION

PATENT NO. : 10,880,132 B1
APPLICATION NO. : 16/666015
DATED : December 29, 2020
INVENTOR(S) : Khashayar Mirfakhraei et al.

It is certified that error appears in the above-identified patent and that said Letters Patent is hereby corrected as shown below:

On the Title Page

On the page 2, in Column 1, Item (56) under "Other Publications", Line 6, delete "EURASIPJournal" and insert -- EURASIP Journal --, therefor.

In the Specification

In Column 1, Line 9, delete "another" and insert -- another. --, therefor.

In Column 5, Line 38, delete "collided signal" and insert -- collided signal. --, therefor.

In Column 6, Lines 45-46, delete "may be may be" and insert -- may be --, therefor.

In Column 6, Line 53, delete "$s_1[n]+h_2[n]$" and insert -- $s_1[n]+h_2[n]*s_2[n]$ --, therefor.

In Column 6, Line 54, delete "$s_1[n],h_2[n]$" and insert -- $s_1[n], h_2[n]$ --, therefor.

In Column 8, Line 33, delete "A first" and insert -- a first --, therefor.

In Column 10, Line 37, delete "$f_{xNL}[n]$" and insert -- $\hat{f}_{xNL}[n]$ --, therefor.

In Column 10, Line 67, delete "$min(Gx\text{-}BB* s_{xp}(t))$" and insert -- $min(Gx\text{-}BB*s_{xp}(t))$ --, therefor.

In Column 11, Line 25, delete "to, to" and insert -- to, --, therefor.

In Column 12, Line 43, delete "$s_{xi}[n]$" and insert -- $s_{xr}[n]$ --, therefor.

In Column 12, Lines 65-66, delete "$h_1(t)\text{-}h_n(t))$" and insert -- $h_1(t)\text{-}h_n(t)$ --, therefor.

In Column 13, Line 7, delete "$s_1(t)\text{-}s_n(t))$." and insert -- $s_1(t)\text{-}s_n(t)$. --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*